(12) United States Patent
Hosoi

(10) Patent No.: US 6,724,424 B1
(45) Date of Patent: Apr. 20, 2004

(54) DIGITAL CAMERA CAPABLE OF PRINTING INSTANTLY AFTER PHOTOGRAPHING

(75) Inventor: Yuji Hosoi, Chiba (JP)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/351,503

(22) Filed: Jul. 12, 1999

(51) Int. Cl.⁷ .............................................. H04N 5/225
(52) U.S. Cl. .................................. 348/207.2; 348/275
(58) Field of Search ........................ 348/207.99, 207.1, 348/207.2, 220.1, 373, 374, 375, 376, 354, 231.79, 231.7, 231.9, 552; 358/1.1, 1.6

(56) References Cited

U.S. PATENT DOCUMENTS

| | | | |
|---|---|---|---|
| 4,937,676 A | * 6/1990 | Finelli et al. | 348/375 |
| 5,715,492 A | 2/1998 | Stephenson | |
| 5,754,227 A | 5/1998 | Fukuoka | |
| 5,917,545 A | * 6/1999 | Kowno et al. | 348/231.9 |
| 6,118,485 A | * 9/2000 | Hinoue et al. | 348/373 |
| 6,163,344 A | * 12/2000 | Kawamura et al. | 348/552 |
| 6,552,748 B1 | * 4/2003 | Sugimoto | 348/354 |

FOREIGN PATENT DOCUMENTS

| | | |
|---|---|---|
| EP | 0683596 | 11/1995 |
| WO | 98030020 | 7/1998 |

\* cited by examiner

*Primary Examiner*—Tuan Ho
(74) *Attorney, Agent, or Firm*—Adams & Wilks

(57) ABSTRACT

A digital camera which is capable of printing instantly after photographing and is easy to be carried and handled and inexpensive is disclosed. A print unit A for allowing a latent image to be formed on a print paper on which a photosensitive type microcapsule has been coated by optically scanning on the basis of an image signal and applying a mechanical pressure to the print paper and developing it, and a display image pickup unit B having a semiconductor image pickup device 32 for converting a video image of a photographing object into digital image signals and a solid state image display 33 for displaying the object are constructed. A flash memory card interface 29 is provided for the display image pickup unit B and a flash memory interface is provided for the print unit A. The display image pickup unit B is controlled by a control unit including a CPU 11 in the print unit A.

13 Claims, 4 Drawing Sheets

DIGITAL CAMERA CAPABLE OF PRINTING INSTANTLY AFTER PHOTOGRAPHING

BACKGROUND OF THE INVENTION

1. Field of the Invention

The present invention relates to a digital camera capable of printing instantly after photographing, and more particularly to a digital camera capable of printing instantly after photographing comprising: a display image pickup unit having a semiconductor image pickup device; and a print unit for scanning a print paper on which a photosensitive type microcapsule has been coated by a print head having light emitting devices and forming a latent image and mechanically pressing the print paper on which the latent image has been formed by a print roller and developing the latent image.

2. Description of the Related Art

The present applicant has developed a portable type printer for use with a digital camera and previously applied for patent (Japanese Patent Application No. Hei 9-152719). In this printer, a print paper on which a photosensitive type microcapsule has been coated is scanned by a print head having three kinds of light emitting devices of red, green, and blue and to thereby form a latent image, and then the latent image is developed through mechanically pressing the print paper on which the latent image has-been formed by a print roller. With respect to a tone, a saturation, and a lightness in printing, an intensity and an irradiation time of irradiation light beams in the light emitting devices are controlled.

The print paper is formed in a manner in which a photosensitive type microcapsule, which has a diameter of about 4 microns, is coated uniformly on a base paper and thereon, an image receiving layer including a developing agent is coated and further thereon, a polyester film is laminated. The microcapsule itself has light translucent property and a microcase made up of merely transparent gelatin having an intensity whose degree is a degree that the microcase might be destroyed through mechanically pressing by the print roller. A coupler which is included in the microcapsule is colorless leuco dye and a material which is colored by contacting the image receiving layer containing the developing agent. As for the coupler, correspondently to three primary colors of light, i.e., red (R), green (G), and blue (B), three primary colors of painting, i.e., magenta (M), yellow (Y), and cyan (C) are prepared. As a photo-curing material which is included in the microcapsule together with the coupler, light of color with a complementary color relation to a which is what appears as a result when the coupler contacts the receiving image layer and reacts is selected. That is, a material which cures in dependence on light of a specific wavelength is selected. With regard to the types of print paper, there is a print paper for monochrome on which only one kind of photosensitive type microcapsule has been coated and a print paper for full color of 256-gradations on which three kinds of photosensitive type microcapsules have been coated. Further, each of the foregoing types of print papers includes print papers for high sensitivity and for low sensitivity.

A printer using a print paper on which a photosensitive type microcapsule has been coated, according to one embodiment as shown in FIG. 4, comprises: a CPU 37; a ROM 38 in which a program for allowing various processes to be performed in accordance with a predetermined procedure has been stored; a DRAM 39 in which image data to be printed and related data such as various parameters are stored; and a control unit having an input/output interface 40 and a bus 41.

The printer also comprises: a print head 44 having light emitting devices for selectively irradiating light beams on the print paper and for forming a latent image; a print roller 45 for applying pressure to the print paper on which the latent image has been formed and for developing it; and a paper feed mechanism 46 for moving the print paper in one direction at a predetermined speed. The printer further comprises: a photosensitive control circuit 47 for controlling a selective light-emission and an irradiation quantity of the light emitting devices in the print head 44; a head driving unit 48 for moving the print head 44 reciprocatively in the direction perpendicular to the moving direction of the print paper; a roller driving unit 49 for driving the print roller 45; and a paper feed driving unit 50 for driving the paper feed mechanism 46. Furthermore, the printer also comprises: input means 42 for inputting image data from video image equipment such as a digital camera, which is supplied through a flash memory card or as transmission signals; and setting means 43 for setting various parameters of the printer or performing an image edit operation, etc.

A digital camera according to one embodiment, as shown in a block diagram of FIG. 5, has: an optical system 51 comprising a photographic lens, a stop, and a shutter; a semiconductor image pickup device 52 such as CCD or MOS transistor; and a solid state image display 53 comprising a semiconductor image display device such as LCD or TFT. The digital camera further has: an optical system driving circuit 54 for driving the optical system 51; an image pickup device driving circuit 55 for driving the semiconductor image pickup device 52; and a display driving circuit 56 for driving the solid state image display 53.

The digital camera also has: a CPU 57; a ROM 58 in which a program for allowing various processes to be executed in accordance with a predetermined procedure has been stored; a DRAM 59 for temporarily storing digital image signals outputted from the semiconductor image pickup device; a flash memory 60 serving as a built-in memory, which stores the digital image signals of an object to be photographed; and a control unit comprising an input/output interface 61 and a bus 62. An external interface 64 for connecting to an external communication line or an image input terminal of a TV and an/external memory interface 65 further constitutes the control unit. Connected to the external memory interface 65 is a connector 66 into which a storage medium such as a flash memory card is inserted.

The printer using the print paper on which the .photosensitive type microcapsule as shown in FIG. 4 has been coated is usually used, while being taken with the digital camera as shown in FIG. 5 at a photographing spot. Namely, the user such as a photographer takes a photograph by the digital camera, and thereafter copies and stores the digital image signals stored in the built-in memory in the digital camera to the flash memory card as an external memory. He then pulls out the flash memory card in which the digital image signals have been stored from the digital camera and inserts it into the card interface serving as an input unit of the printer. He stores digital still image signals into the built-in memory in the printer and thus completes preparation for printing. Such preparation for printing, however, is quite troublesome for the photographer, etc. In addition, although the printer is obvious, even if the digital camera is compact, its weight and volume might be remarkably large. It is consequently difficult to carry both printer and digital camera as mentioned above at the photographing spot, and also inconvenient to handle them.

SUMMARY OF THE INVENTION

An object of the present invention is to provide a digital camera capable of printing on print paper, on which the photosensitive type microcapsule has been coated, instantly just after photographing, and also to provide a digital camera which is easily carried and handled and inexpensive as well.

To solve the above problems, a digital camera capable of printing instantly after photographing according to the present invention comprises two units of: a print unit having a paper feed mechanism for feeding in one direction a print paper on which a photosensitive type microcapsule has been coated, a print head having light emitting devices for optically scanning on the basis of an image signal and for forming a latent image onto the print paper, a print roller for applying a mechanical pressure to the print paper on which the latent image has been formed and for developing the latent image, and a control unit having a CPU; and a display image pickup unit having a semiconductor image pickup device for converting a video image of a photographing object entering through an optical system into digital image signals. A card interface is provided for one of the display image pickup unit and the print unit. An interface into which the card interface is inserted is provided for the other unit, thereby enabling the display image pickup unit to be detachable from the print unit and the display image pickup unit is controlled by the control unit of the print unit.

The print unit is formed in a portable type and the display image pickup unit is formed in a card type. A solid state image display for displaying a photographing object is further provided for the display image pickup unit. Upon printing, the solid state image display displays an image to be printed by the print unit.

BRIEF DESCRIPTION OF THE DRAWINGS

For a more better understanding of the present invention, reference is made of a detailed description to be read in conjunction with the accompanying drawings, in which.

DETAILED DESCRIPTION OF THE PREFERRED EMBODIMENTS

Figure 1:
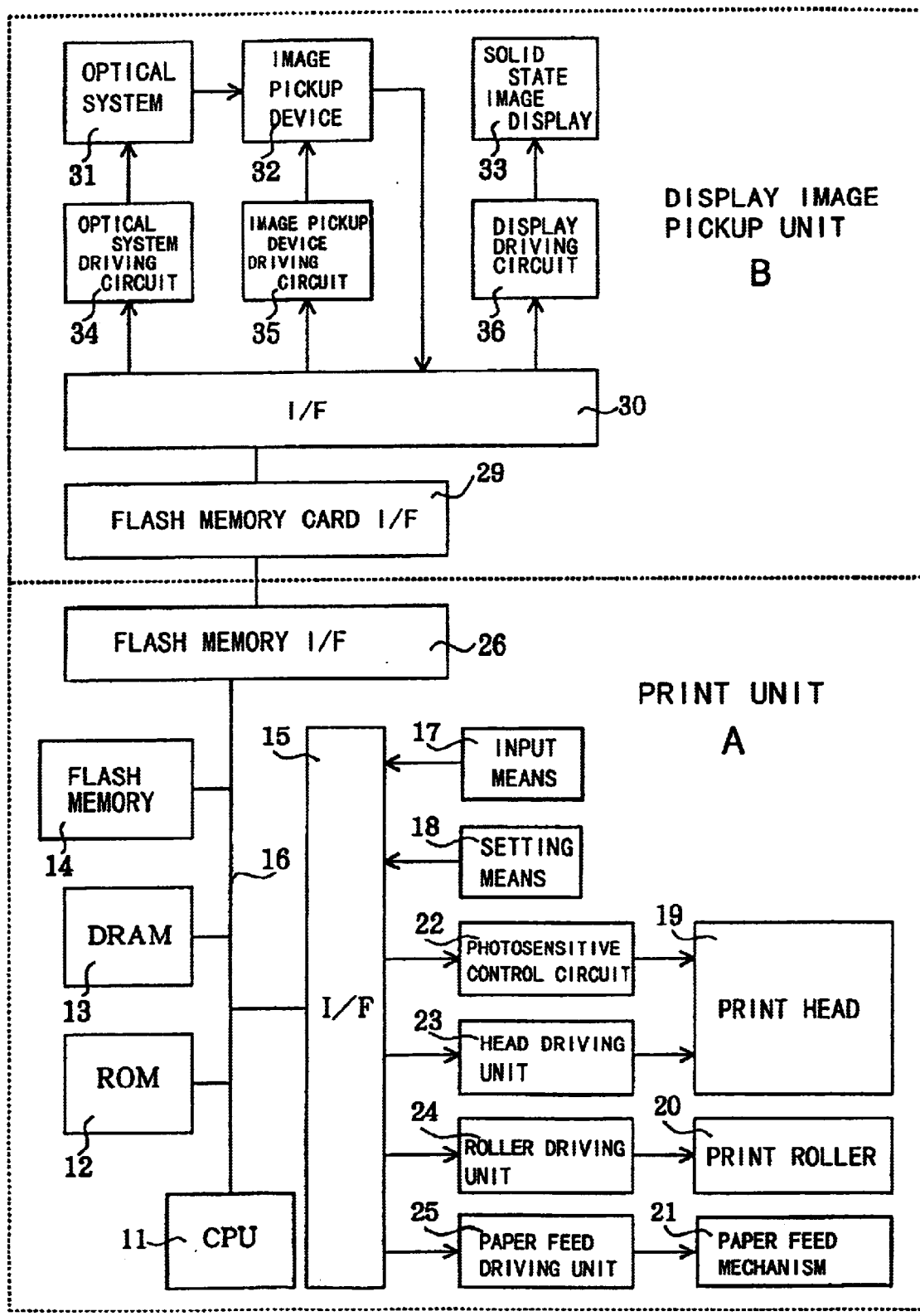
FIG. 1 is a block diagram showing a construction of an embodiment of a digital camera capable of printing instantly after photographing.
Figure 2:
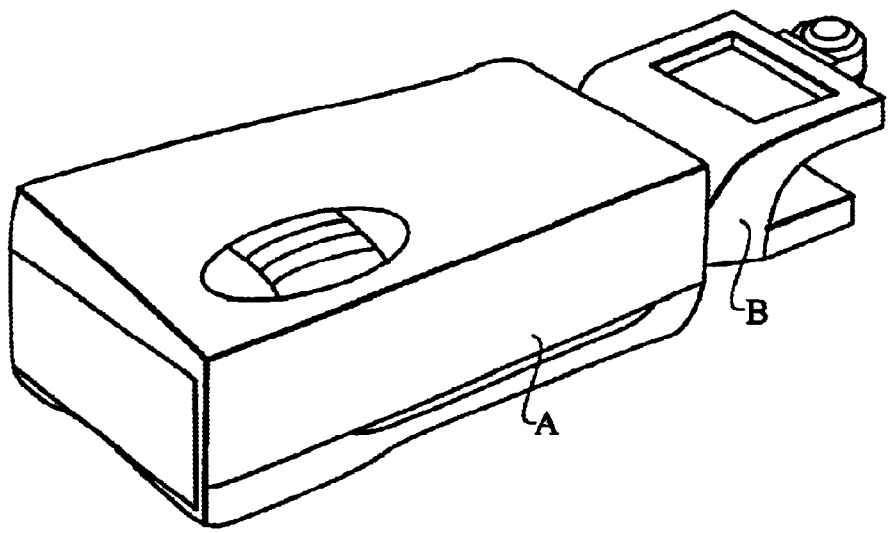
FIG. 2 is a perspective view of an embodiment of a digital camera in a state where a display image pickup unit is attached to a print unit.
Figure 3:
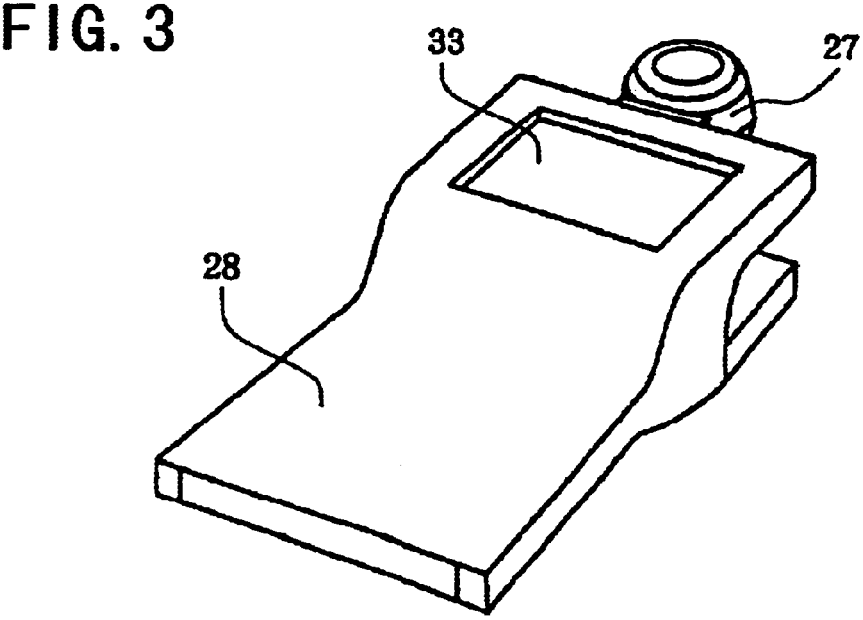
FIG. 3 is perspective view of an embodiment of a card type display image pickup unit.
Figure 4:
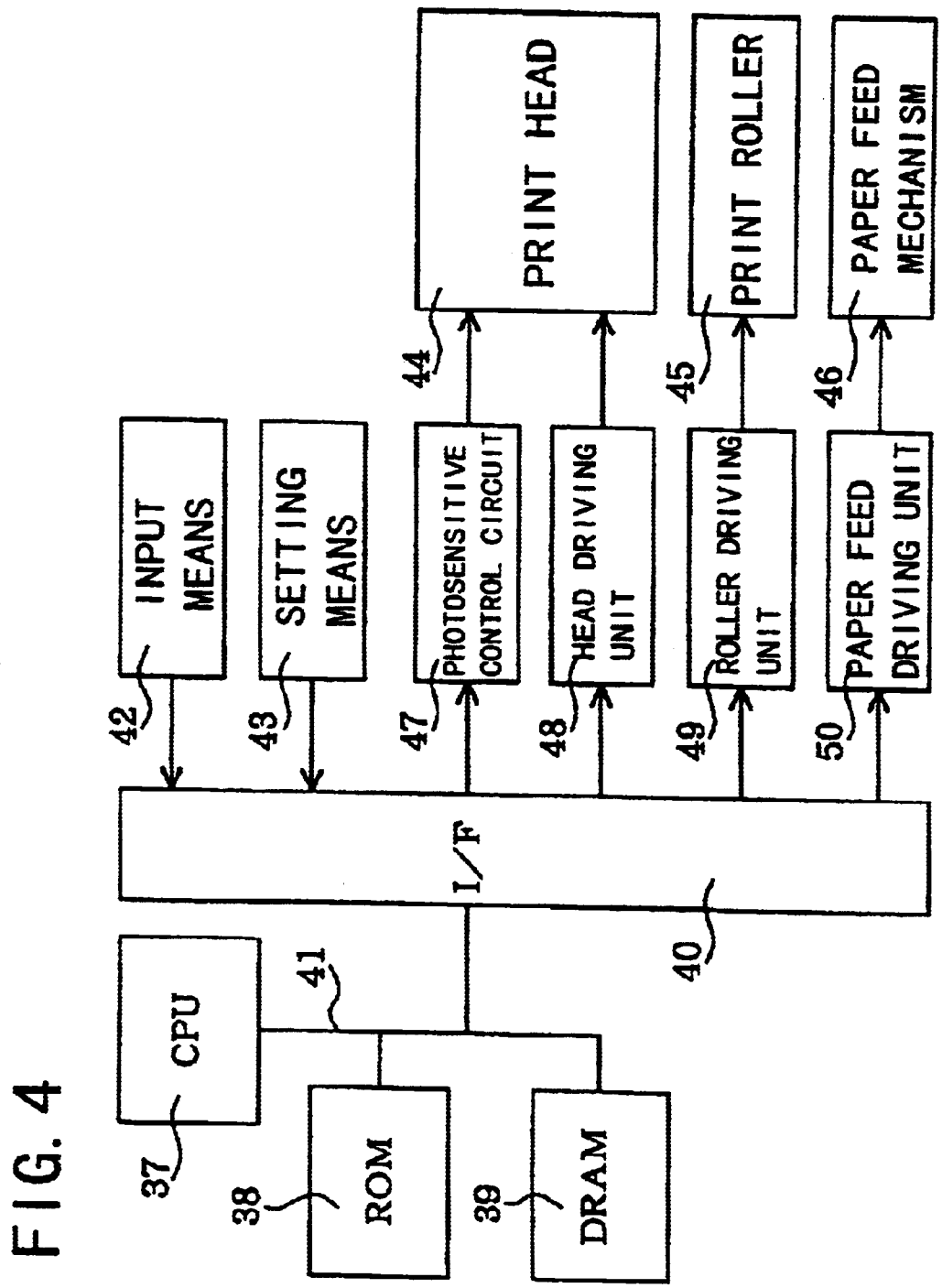
FIG. 4 is a block diagram showing a construction of an embodiment of a printer using a print paper on which a conventional photosensitive type microcapsule has been coated.
Figure 5:
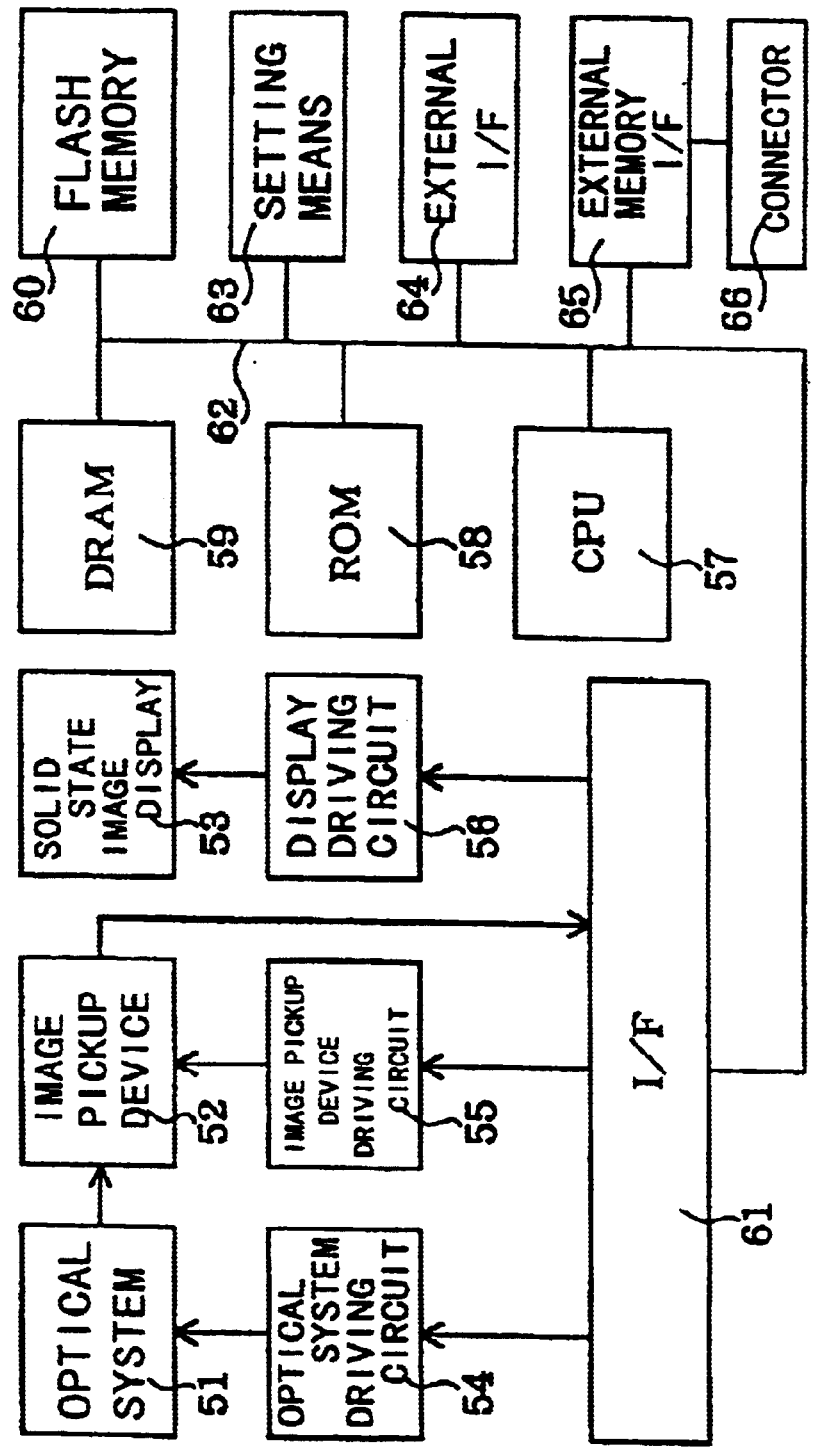
FIG. 5 is a block diagram showing a construction of an embodiment of a conventional digital camera.

A digital camera capable of printing instantly after photographing according to one embodiment of the present invention, as respectively shown in a block diagram of FIG. 1 and in a perspective view of FIG. 2, comprises two units, including a print unit A which is formed in a portable configuration and a display image pickup unit B which is formed in a card type configuration. The display image pickup unit B that is detachable from the print unit A, as illustrated in a perspective view of FIG. 3, has: an optical case 27 in which an optical system 31 such as a lens and a semiconductor image pickup device 32 are arranged; a card type display image pickup case 28 whose one end portion is fixed to the optical case 27; and a solid state image display 33 which is attached to a surface of the card type display image pickup case 28 in parallel or in a slightly inclined manner. The other end portion of the card type display image pickup case 28 constitutes a part of a flash memory card interface 29.

The print unit A as illustrated in FIG. 1 functions as a printer using the print paper on which the photosensitive type microcapsule has been coated. The print unit A has: a CPU 11; a ROM 12 in which a program for allowing various processes to be performed in accordance with a predetermined procedure has been stored; a DRAM 13 in which related data such as various parameters is stored; a flash memory 14 in which image data to printed is stored; and a control unit comprising an input/output interface 15 and a bus 16.

The print unit A also has: a print head 19 having light emitting devices for selectively irradiating light beams onto the print paper and for forming a latent image; a print roller 20 for pressing the print paper on which the latent image has been formed and for developing it; and a paper feed mechanism 21 for moving in one direction the print paper at a predetermined speed. The print unit A further has a photosensitive control unit 22 for controlling a selective light-emission and an irradiation quantity of the light emitting devices in the print head 19; a head driving unit 23 for reciprocatively moving the print head 19 at a predetermined speed in the direction perpendicular to the moving direction of the print paper; a roller driving unit 24 for driving the print roller 20; and a paper feed driving unit 25 for driving the paper feed mechanism 21. Input means 17 is means for inputting digital information of an image to be printed from an apparatus other than the display image pickup unit B or from a medium such as a flash memory card. Setting means 18 is means comprising ten-key input pad or the like for setting various parameters which are necessary for photographing and printing by the digital camera or performing image editing, etc.

The display image pickup unit B, as shown in FIG. 1, has: an optical system 31 comprising a photographic lens, a stop, and a shutter; a semiconductor image pickup device 32 such as CCD or MOS transistor; a solid state image display 33 comprising a solid state image display device such as an LCD or TFT display; an optical system driving circuit 34 for driving the optical system 31; an image pickup device driving circuit 35 for driving the semiconductor image pickup device 32; and a display driving circuit 36 for driving the solid state image display 33. The display image pickup unit B further has: an input/output interface 30; and the flash memory card interface 29. Connected to the flash memory card interface 29 may be a connector in which a storage medium such as a flash memory card is inserted. An external interface to connect to an external communication line or an image input terminal of a TV is also provided for the display image pickup unit B, according to the necessity.

Photographing by a digital camera according to the present invention is executed in a state where the display image pickup unit B is attached to the print unit A, as shown in FIGS. 1 and 2. On this occasion, the display image pickup unit B is controlled by the control unit in the print unit A. That is, upon photographing, the control unit having the CPU 11 in the print unit A controls, through a flash memory interface 26, the flash memory card interface 29, and the input/output interface 30, the optical system driving circuit 34, the image pickup device driving circuit 35, and the display driving circuit 36. The control unit also drives the optical system 31, the semiconductor image pickup device 32, and the solid state image display 33, respectively.

A video image of the object entering through the optical system 31 is converted into digital image signals by the semiconductor image pickup device 32. The digital image signals output from the semiconductor image pickup device 32 are, through the input/output interface 30, the flash memory card interface 29, and the flash memory interface 26, temporarily stored into the DRAM 13. The digital image signals of the object which have been temporarily stored in the memory 13 are, through the flash memory interface 26, the flash memory card interface 29, and the input/output interface 30, transmitted to the display driving circuit 36, and the video image of the object is displayed to the solid state image display 33. Therefore, the user as a photographer can take a picture while seeing the displayed image in the solid state image display 33.

The video image of the object photographed by the display image pickup unit B is converted into digital image signals by the semiconductor image pickup device 32. The digital image signals from the semiconductor image pickup device 32 are, through the input/output interface 30, the flash memory card interface 29, and the flash memory interface 26, stored into the flash memory 14.

Printing by the digital camera according to the present invention is performed in a state where the display image pickup unit B is attached to the print unit A as shown in FIGS. 1 and 2. The digital image signals of the object stored in the flash memory 14 are, through the flash memory interface 26, the flash memory card interface 29, and the input/output interface 30, transmitted to the display driving circuit 36, and the video image of the object is displayed to the solid state image display 33. While seeing the displayed image of the solid state image display 33, the user operates the setting means 18 and selects or edits a target image to be printed. After completing a selection or editing of the target image to be printed, a latent image of the target image is formed onto the print paper on which the photosensitive type microcapsule has been coated. A mechanical pressure is then applied to the print paper on which the latent image has been formed and the latent image is developed. Further, the developed latent image is fixed by heating and fixing means (not shown) and the printing is completed. A series of operations is executed through controlling the photosensitive control circuit 22, the head driving unit 23, and the roller driving unit 24 by the control unit in the print unit A and driving the print head 19, the print roller 20, and the paper feed mechanism 21, respectively.

According to the present invention, a digital camera capable of printing instantly after photographing, comprising: a print unit for allowing a latent image to be formed onto a print paper on which a photosensitive type microcapsule has been coated by the optically scanning on the basis of an image signal and developing the latent image by applying a mechanical pressure to the print paper on which the latent image has been formed; and a display image pickup unit having a semiconductor image pickup device for converting a video image of a photographing object entering through an optical system into digital image signals, is characterized in that a card interface and an interface in which the card interface is inserted are used and thus the display image pickup unit is detachable from the print unit, and the display image pickup unit is controlled by a control unit in the print unit. The digital camera capable of printing instantly after photographing can be realized.

The digital camera according to the present invention comprises two units of the print unit formed in a portable type and the display image pickup unit formed in a card type. Hence, the display image pickup unit is easily detachable from the print unit and even in the state where the display image pickup unit is attached to the print unit, the weight and volume of the digital camera as a whole might not be so increased and the digital camera is compact and easily used for photographing. As the necessity may arise, the digital camera is able to be separated into two units, so that it is convenient to carry the digital camera. Instead of providing a control unit for the display image pickup unit, the optical system, the image pickup device, and the solid state image display are controlled by the control unit in the print unit A. In a construction that a solid state image display is provided for the display image pickup unit, the solid state image display of the display image pickup unit is also used commonly for photographing and for printer. The structure therefore is simple and also the price is inexpensive.

What is claimed is:

1. A digital camera capable of printing instantly after photographing, comprising:

a print unit having a paper feed mechanism for feeding in one direction a print paper coated with photosensitive microcapsules, a print head having light emitting devices mounted to undergo scanning movement with respect to the print paper on the basis of an image signal to form a latent image onto the print paper, a print roller for applying a mechanical pressure to the print paper on which the latent image has been formed and developing the latent image, and a control unit having a CPU;

and a display image pickup unit having an optical system for receiving an image of an object to be photographed, and a semiconductor image pickup device for converting the image of the object entering through the optical system into digital image signals; and an interface for connecting the display image pickup unit and the print unit;

wherein the interface comprises a card and slot interface wherein one of the display image pickup unit and the print unit has a slot for receiving the other, and the other has a card type configuration which allows it to be placed into and removed from the slot of the one, thereby enabling the display image pickup unit to be detachable from the print unit; and wherein the display image pickup unit is controlled by the control unit of the print unit when connected thereto.

2. A digital camera capable of printing instantly after photographing according to claim 1; wherein the print unit has a portable configuration and the slot is formed therein, and the display image pickup unit is formed in a card type configuration and is receivable in the slot formed in the print unit.

3. A digital camera capable of printing instantly after photographing according to either one of claims 1 and 2; wherein the display image pickup unit further comprises a solid state image display for displaying the object to be photographed and a photograph to be printed.

4. A digital camera capable of printing instantly after photographing according to claim 1; wherein the print unit has the slot and the display image pickup unit has the card type configuration, and the CPU of the print unit controls the display image pickup unit to transfer the digital image signals to the print unit to cause an image to be printed automatically only when the display image pickup unit is inserted into the slot of the print unit.

5. A digital camera capable of printing instantly after photographing according to claim 1; wherein the print unit has the slot and the display image pickup unit has the card type configuration, and the CPU of the print unit controls the display image pickup unit so that the display image pickup unit is operable only when inserted into the slot of the print unit.

6. A camera and photo printer, comprising:

an image pickup unit having an optical system for receiving an image of an object to be photographed and outputting an optical image thereof, and an image pickup device for converting the optical image into image signals;

a photograph printing unit comprising a paper feed mechanism for feeding a print paper coated with a photosensitive material, and a print head mounted to undergo scanning movement with respect to the print paper to selectively expose the photosensitive material coated on the print paper on the basis of the image signals to form an image on the print paper; and a control unit mounted in one of the photograph printing unit and the image pickup unit for controlling the paper feed mechanism to feed the print paper, the print head to undergo scanning movement, and the image pickup unit to transfer the image signals to the photograph printing unit;

wherein the photograph printing unit and the image pickup unit are connectable through an interface through which control signals from the control unit and image signals are transferred from the image pickup unit to the photograph printing unit, the interface comprising a card and slot configuration in which one of the photograph printing unit and the image pickup unit is configured to be slidable into the other, and the other has a slot for receiving the one.

7. A camera and photo printer according to claim 6; wherein the image pickup device comprises a semiconductor device for converting the optical image into digital image signals.

8. A camera and photo printer according to claim 6; wherein the print paper is coated with photosensitive microcapsules, the print head has a plurality of light emitting elements for exposing the photosensitive microcapsules in accordance with the digital image signals to form a latent image thereon; and wherein the photograph printing unit further comprises a print roller for applying mechanical pressure to print paper on which the latent image has been formed and developing the latent image.

9. A camera and photo printer according to claim 6; wherein the image pickup unit further comprises an image display unit for displaying at least one of the object to be photographed and an image to be printed.

10. A camera and photo printer according to claim 9; wherein the image display unit comprises a liquid crystal display.

11. A camera and photo printer according to claim 6; wherein the image pickup unit further comprises a flash memory for storing digital image signals and transferring the digital image signals to the photograph printing unit.

12. A camera and photo printer according to claim 6; wherein the control unit is mounted in the photograph printing unit, the photograph printing unit has the slot into which the image pickup unit is slidable, and the control unit controls the image pickup unit to transfer the image signals to the photograph printing unit to cause an image to be printed automatically only when the image pickup unit is inserted into the slot of the photograph printing unit.

13. A camera and photo printer according to claim 6; wherein the control unit is mounted in the photograph printing unit, the photograph printing unit has the slot into which the image pickup unit is slidable, and the control unit controls the image pickup unit so that the image pickup is operable only when inserted into the slot of the photograph printing unit.

* * * * *